United States Patent
Moustier et al.

(10) Patent No.: US 6,865,028 B2
(45) Date of Patent: Mar. 8, 2005

(54) METHOD FOR CAPTURING A PANORAMIC IMAGE BY MEANS OF AN IMAGE SENSOR RECTANGULAR IN SHAPE

(75) Inventors: Christophe Moustier, Marseilles (FR); Benjamin Blanc, Montreal (CA)

(73) Assignee: 6115187 Canada Inc., Quebec (CA)

( * ) Notice: Subject to any disclaimer, the term of this patent is extended or adjusted under 35 U.S.C. 154(b) by 0 days.

(21) Appl. No.: 10/760,498

(22) Filed: Jan. 20, 2004

(65) Prior Publication Data

US 2004/0169726 A1 Sep. 2, 2004

Related U.S. Application Data

(63) Continuation of application No. PCT/FR02/02483, filed on Jul. 12, 2002.

(30) Foreign Application Priority Data

Jul. 20, 2001 (FR) ............................................. 01 09735

(51) Int. Cl.[7] ............................ G02G 13/06; H04N 7/00
(52) U.S. Cl. ......................................... 359/725; 348/36
(58) Field of Search ............................ 359/725; 348/36, 348/38, 39; 352/69

(56) References Cited

U.S. PATENT DOCUMENTS

| | | | |
|---|---|---|---|
| 5,563,650 A | 10/1996 | Poelstra | |
| 5,686,957 A | 11/1997 | Baker | |
| 6,744,569 B2 * | 6/2004 | Geng | 359/725 |

FOREIGN PATENT DOCUMENTS

EP      0 695 085 A1     1/1996

\* cited by examiner

Primary Examiner—Georgia Epps
Assistant Examiner—Jack Dinh
(74) Attorney, Agent, or Firm—Akin Gump Strauss Hauer & Feld, LLP

(57) ABSTRACT

A method for capturing a digital panoramic image, includes projecting a panorama onto an image sensor by means of a fish-eye objective lens having a constant field angle relative to its optical axis. The image sensor is rectangular in shape. The fish-eye objective lens is provided to project onto the image sensor, without reducing the field of view, a distorted panoramic image that covers a number of pixels on the image sensor higher than the number of pixels that would be covered by an image disk.

21 Claims, 9 Drawing Sheets

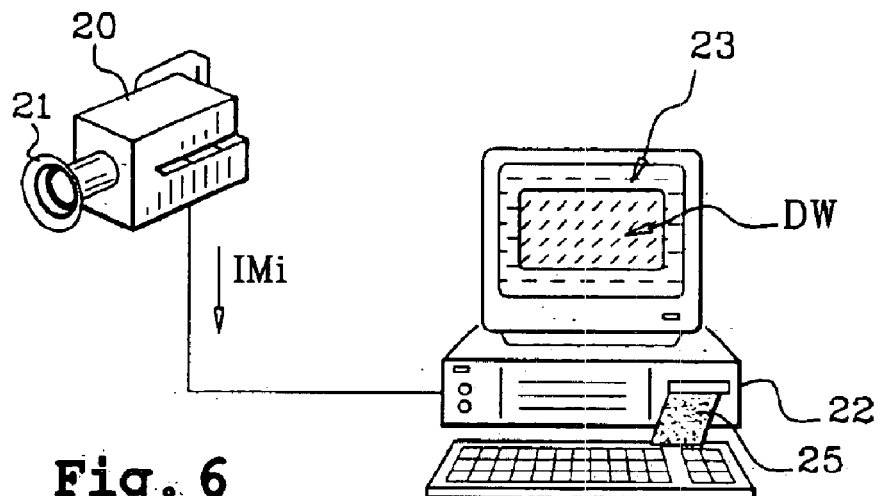
Fig. 6
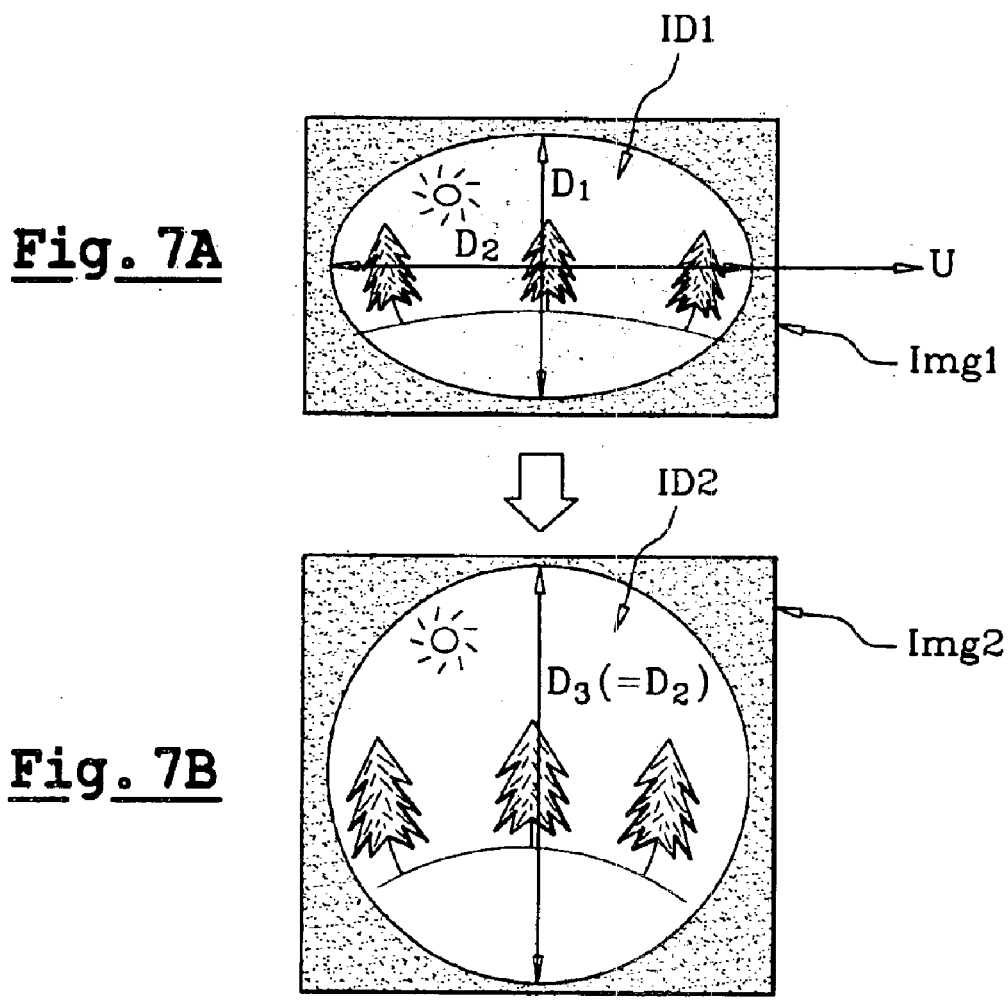
Fig. 7A
Fig. 7B

| S1 – Acquisition |
|---|
| - Capturing a panoramic image by means of a still digital camera or a digital video camera equipped with a panoramic objective lens according to the present invention<br>　　　　? Obtaining an image ellipsoid (D1, D2) |

| S2 - Transfer of the image file into a computer |
|---|
| - Transfer of the image file of the image ellipsoid into a microcomputer,<br>- Storage in the auxiliary storage (optional) |

| S3 - Correction of the image ellipsoid |
|---|
| - Transfer of the image points of the image ellipsoid into a virtual image disk of radius D2 comprising more image points than an image disk of radius D1,<br>　　　　? Obtaining a classical image disk |

| S4 – Digitisation |
|---|
| - Transfer of the image points of the image disk into a system of axes OXYZ in spherical coordinates<br>　　　　? Obtaining a hemispherical panoramic image |

| S5 - Interactive display |
|---|
| - Determination of the image points of an image sector to be displayed<br>- Display of the image sector on a display window<br>- Detection of the user's actions on a screen pointer or any other control means,<br>- Detection of the user's actions on keys for image enlargement,<br>- Modification of the sector displayed (sliding the image sector displayed on the surface of the hemisphere and/or shrinking/expanding the image sector displayed) |

Fig. 8

S1 – Acquisition

- Capturing a panoramic image by means of a still digital camera or a digital video camera equipped with a panoramic objective lens according to the present invention
  ? Obtaining an image ellipsoid

S2 – Transfer of the image file into a computer

- Transfer of the image file of the image ellipsoid into a microcomputer,
  - Storage in the auxiliary storage (optional)
-

S3' – Interactive display with implicit correction of the distortions of the initial image A - Determination of the colour of the points $E(i, j)$ of an image sector using the points $P'(pu, pv)$ of the image ellipsoid:
1- Determination of the coordinates $Ex$, $Ey$, $Ez$ in the coordinate system $OXYZ$ of each point $E(i, j)$ of the image sector,
2- Determination of the coordinates $px$, $py$, $pz$ of points $P(px,py,pz)$ corresponding to the points $E(i, j)$ projected onto a hemisphere,
3- by means of the distribution function $Fd$ of the objective lens, determination of the coordinates, in the coordinate system $O'UV$ of the image ellipsoid, of the points $P'(pu, pv)$ corresponding to the projection of the points $P(px,py,pz)$ on the image ellipsoid, B - Presentation of the image sector in a display window C - Detection of the user's actions on a screen pointer or any other control means D - Detection of the user's actions on enlargement keys E - Modification of the image sector displayed (moving and/or shrinking/expanding the image sector)

Fig. 10

METHOD FOR CAPTURING A PANORAMIC IMAGE BY MEANS OF AN IMAGE SENSOR RECTANGULAR IN SHAPE

CROSS-REFERENCE TO RELATED APPLICATIONS

This application is a continuation of International Application No. PCT/FR02/02483, filed Jul. 12, 2002, and the disclosure of which is incorporated herein by reference.

BACKGROUND OF THE INVENTION

The present invention relates to obtaining digital panoramic images and displaying panoramic images on computer screens. The present invention also relates to a method for displaying an initial panoramic image captured in accordance with the above-mentioned method on a screen.

FIG. 1 represents a classical device allowing a digital panoramic image to be produced and presented on a computer screen. The device comprises a digital camera 1 equipped with a fish-eye objective lens 2 having a constant field angle relative to its optical axis and preferably offering a solid image capture angle of at least $2\pi$ steradians (i.e. a field angle of at least 180°). The camera 1 is connected to a computer 5, such as a microcomputer for example, equipped with a screen 6. The connection to the microcomputer 5 may be permanent, when, for example, the camera 1 is a digital video camera, or temporary, when, for example, the camera 1 is a still digital camera equipped with an image memory.

FIG. 2 schematically represents the appearance of a panoramic image 4 projected onto a digital image sensor 3 by means of the fish-eye objective lens 2. In accordance with the most widespread industrial standard for consumer digital cameras, the image sensor 3 is rectangular in shape, to produce rectangular photographs in 4/3 format (video format). The image of the panorama projected onto the image sensor has the shape of a disk and is characteristic of the axial symmetry of fish-eye objective lenses having a constant field angle relative to their optical axis. The entire image on the rectangular image sensor therefore has dark edges that will be removed when digitally processed subsequently. This rectangular digital image comprising the image disk 4 is delivered by the camera 1 in the form of a computer file containing image points coded RGBA arranged in a two-dimensional table, "R" being the red pixel of an image point, "G" the green pixel, "B" the blue pixel, and "A" the Alpha parameter or transparency, the parameters R, G, B, A generally being coded on 8 bits.

The image file is then transferred into the microcomputer 5 which transforms the initial image disk 4 into a three-dimensional digital image, then presents the user with a sector of the three-dimensional image in a display window DW occupying all or part of the screen 6.

FIG. 3 schematically shows classical steps of transforming the two-dimensional panoramic image into a panoramic image offering a realistic perspective effect. After removing the black edges of the image, the microcomputer has a set of image points forming an image disk 10 of center O' and axes O'U and O'V. The image points of the image disk 10 are transferred into a three-dimensional space defined by an orthogonal coordinate system of axes OXYZ, the axis OZ being perpendicular to the plane of the image disk. The transfer is performed by a mathematical function implemented by an algorithm executed by the microcomputer, and leads to obtaining a set of image points referenced in the coordinate system OXYZ. These image points are for example coded in spherical coordinates RGBA($\phi,\theta$), $\phi$ being the latitude and $\theta$ the longitude of an image point, the angles $\phi$ and $\theta$ being coded on 4 to 8 bytes (IEEE standard). These image points form a sphere portion HS covering a solid angle of at least $2\pi$ steradians relative to the center O of the system. The microcomputer therefore has a three-dimensional virtual image one sector 11 of which, corresponding to the display window DW mentioned above, is presented on the screen (FIG. 1) considering that the observer is on the central point O of the system of axes OXYZ, which defines with the center O" of the image sector 11, a direction OO" called "viewing direction".

This technique of displaying a digital panoramic image sector on a computer screen has various advantages, particularly the possibility of "exploring" the panoramic image by sliding the image sector 11 presented on the screen to the left, the right, upwards or downwards, until the limits of the panoramic image are reached. This technique also allows complete rotations to be carried out inside the image when two complementary digital images have been taken and supplied to the microcomputer, the latter thus reconstituting a complete panoramic sphere by assembling two hemispheres. Another advantage provided by presenting a panoramic image on screen is to enable the observer to make enlargements or zooms on parts of the image. The zooms are performed digitally, by shrinking the image sector displayed and expanding the distribution of the image points on the pixels of the screen.

Despite these various advantages, digital zooms have the disadvantage of being limited by the resolution of the image sensor, which is generally much lower than that of a classical photograph. Therefore, when the enlargement increases, the granulosity of the image appears as the limits of the resolution of the image sensor are being reached.

To overcome this disadvantage, it is well known to proceed with pixel interpolations so as to delay the apparition of the blocks of color which betray the limits of the resolution of the sensor. However, this method only improves the appearance of the enlarged image sector and does not in any way increase the definition. Another obvious solution is to provide an image sensor with a high resolution, higher than the resolution required to present an image sector without enlargement, so that there is a remaining margin of definition for zooms. However, this solution is expensive as the cost price of an image sensor rapidly rises with the number of pixels per unit of area. Yet another classical solution involves arranging the image sensor in a plane in which the diameter of the image disk is equal to the length of the image sensor. Thus the entire surface of the image sensor is covered but the image projected is cut off at the top and the bottom widthwise of the image sensor. The disadvantage is, in this case, a reduction in the field of view.

BRIEF SUMMARY OF THE INVENTION

The present invention comprises methods to improve the definition offered by digital enlargements concerning certain parts of a digital panoramic image, without the need to increase the number of pixels per unit of area of an image sensor and without reducing the field of view.

The present invention is based on two premises:
1) rectangular image sensors used in consumer digital cameras, particularly 4/3 sensors, are not optimised for fish-eye image capture. As it was seen above in relation with FIG. 2, the black edges on each side of the image disk 4 occupy a substantial surface area and represent a significant number of wasted pixels, to the detriment of the definition and the quality of the digital zooms, 2) in many applications such as video surveillance, videoconferencing, visio-conferencing, the most interesting zone of a digital panoramic image is generally situated towards the center of the image, along a horizontal line that crosses the image disk from left to right passing through its center. In the field of leisure, most panoramic images also comprise parts that are less interesting than others, such as the parts representing the sky or a ceiling for example, as well as the ground, the most useful part generally being located in the vicinity of the center of the image, along the above-mentioned horizontal line.

On the basis of these premises, the present invention provides an expansion of the fish-eye image projected onto a rectangular image sensor, by providing and using a fish-eye objective lens according to the present invention that distorts the images by anamorphose and stretches them sideways without reducing the field of view. Thus, this expansion is performed lengthwise of the image sensor, without expanding the image widthwise of the image sensor to avoid the image going beyond the sensitive surface area of the sensor. The central zone of the image along the above-mentioned horizontal line then covers a greater number of pixels of the image sensor than if it were not expanded, and has a better definition, which substantially improves the quality of digital zooms.

According to another aspect of the present invention, subsequent processing of the image is provided to correct the optical distortions of the objective lens while keeping the advantage of a better definition, and an image sector free from distortion is presented in a display window.

More particularly, the present invention relates to a method for capturing a digital panoramic image, comprising a step of projecting a panorama onto an image sensor by means of a fish-eye objective lens having a constant field angle relative to its optical axis, the image sensor being rectangular in shape, in which the fish-eye objective lens is provided to project onto the image sensor, without reducing the field of view, a distorted panoramic image which is not in the shape of a disk and which covers a number of pixels on the image sensor higher than the number of pixels that would be covered by a conventional image disk.

According to one embodiment, the fish-eye objective lens has an image point distribution function that varies according to axes perpendicular to the optical axis of the objective lens, and which has a minimum spreading rate of the image along a first axis perpendicular to the optical axis and a maximum spreading rate of the image along at least a second axis perpendicular to the optical axis, such that the image projected onto the image sensor is expanded along the second axis.

According to one embodiment, the first and the second axes of the objective lens are perpendicular and the image projected by the objective lens onto the image sensor is ellipsoidal in shape.

According to one embodiment, the image sensor is arranged relative to the first and second axes of the objective lens so that the major axis of the ellipsoidal image coincides with an effective length of the image sensor.

According to one embodiment, the image sensor is arranged relative to the first and second axes of the objective lens so that the major axis of the ellipsoidal image coincides with a diagonal of the image sensor.

According to one embodiment, the objective lens has a distribution function that is not linear and that has a maximum divergence of at least ±10% compared to a linear distribution function, such that the projected image has at least one substantially expanded zone and at least one substantially compressed zone.

According to one embodiment, the fish-eye objective lens comprises a combination of a group of lenses provided to capture a panoramic image according to a determined field angle, and of at least one cylindrical lens having an axis of revolution perpendicular to the optical axis of the objective lens.

The present invention also relates to a method for displaying on a screen an initial panoramic image captured in accordance with the method according to the present invention, comprising a step of correcting the distortions of the initial image.

According to one embodiment, the correction step comprises transforming the initial image into a corrected digital image in the shape of a disk, the diameter of the corrected image being chosen so that the corrected image comprises a number of image points higher than the number of pixels of the image sensor covered by the initial image.

According to one embodiment, the initial image is ellipsoidal in shape and the corrected image has a diameter the size in number of pixels of which is at least equal to the size in number of pixels of the major axis of the initial ellipsoidal image.

According to one embodiment, the method comprises projecting, onto the initial image, image points of an image sector to be presented on the screen, allowing the colors of the image points of the image sector to be presented on the screen to be determined, the step of projecting the image points of the image sector onto the initial image being performed by means of a distribution function representative of the optical properties of the fish-eye objective lens, such that the step of correcting the distortions of the initial image is implicit in the projection step.

According to one embodiment, the projection step comprises a first step of projecting the image points of the image sector onto a sphere portion and a second step of projecting, onto the initial image, the image points projected onto the sphere portion.

The present invention also relates to a computer program product recorded on a medium and loadable into the memory of a digital computer, comprising program codes executable by the computer, arranged to execute the steps of the display method according to the present invention.

The present invention also relates to a fish-eye objective lens having a constant field angle relative to its optical axis, comprising optical means for projecting the image of a panorama onto an image sensor, and optical means for projecting, without reducing the field of view, a distorted image that is not in the shape of a disk and which covers a number of pixels on an image sensor higher than the number of pixels that would be covered by a conventional image disk.

According to one embodiment, the objective lens has an image point distribution function that varies according to axes perpendicular to the optical axis of the objective lens, and which has a minimum spreading rate of the image along a first axis perpendicular to the optical axis, and a maximum spreading rate of the image along at least a second axis perpendicular to the optical axis, such that an image delivered by the objective lens is expanded along the second axis.

According to one embodiment, the objective lens has a distribution function that is not linear and that has a maximum divergence of at least ±10% compared to a linear distribution function, such that an image delivered by the objective lens has at least one substantially expanded zone and at least one substantially compressed zone.

According to one embodiment, the objective lens comprises a combination of a group of lenses provided to capture a panoramic image according to a determined field angle and at least one cylindrical lens having an axis of revolution perpendicular to the optical axis of the objective lens.

According to one embodiment, the objective lens comprises optical means forming an apodizer.

According to one embodiment, the optical means forming an apodizer comprise at least one aspherical lens.

According to one embodiment, the objective lens comprises at least one distorting mirror.

According to one embodiment, the objective lens is of the panoramic adapter type and is provided to be placed in front of a still camera non-panoramic objective lens.

BRIEF DESCRIPTION OF THE SEVERAL VIEWS OF THE DRAWINGS

FIG. 6 represents a system for displaying a digital panoramic image;

FIGS. 7A–7B show a first method for correcting a panoramic image according to the present invention;

FIG. 8 is a flow chart describing a method for displaying a panoramic image incorporating the first correction method;

FIG. 10 is a flow chart describing a method for displaying a panoramic image incorporating the second correction method;

DETAILED DESCRIPTION OF THE INVENTION

Figure 1:
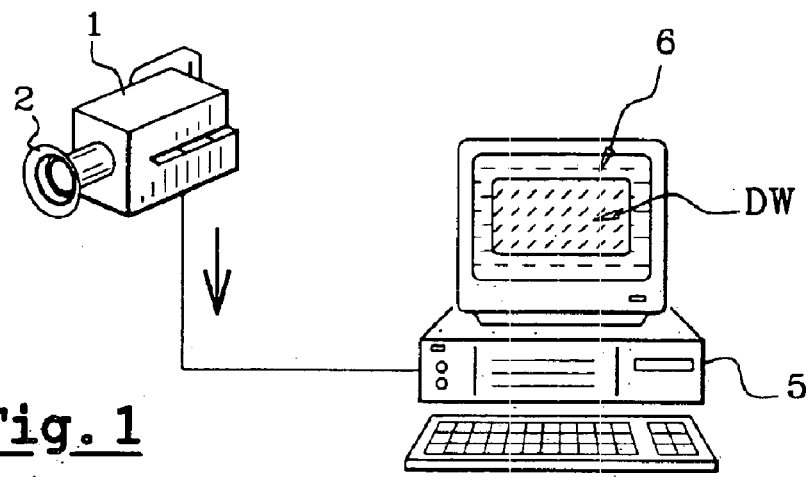
FIG. 1 described above represents a classical system for displaying a digital panoramic image on a screen.
Figure 2:
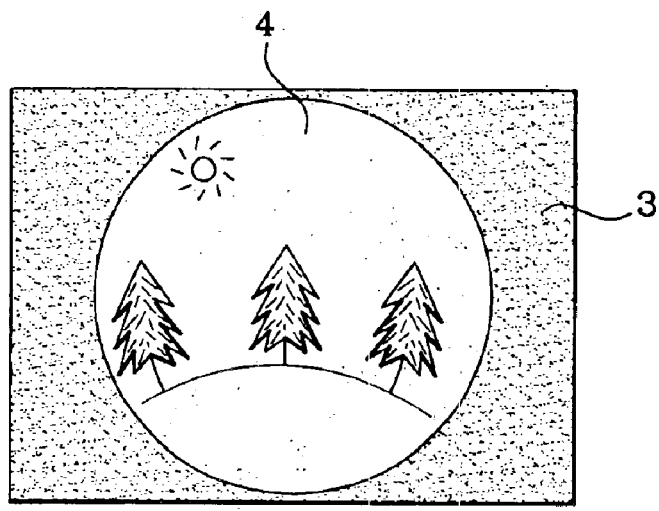
FIG. 2 described above represents a fish-eye type panoramic image projected onto a rectangular image sensor.
Figure 3:
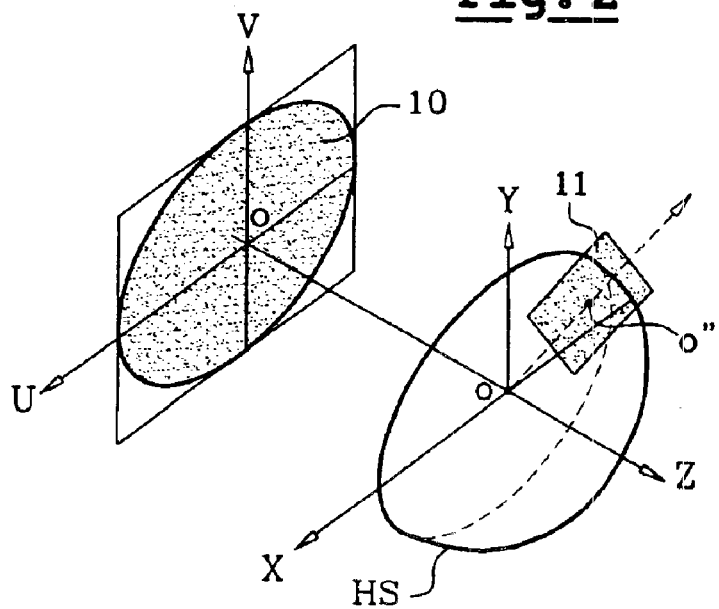
FIG. 3 described above shows a classical method for transforming a two-dimensional panoramic image into a three-dimensional digital panoramic image.
Figure 4:
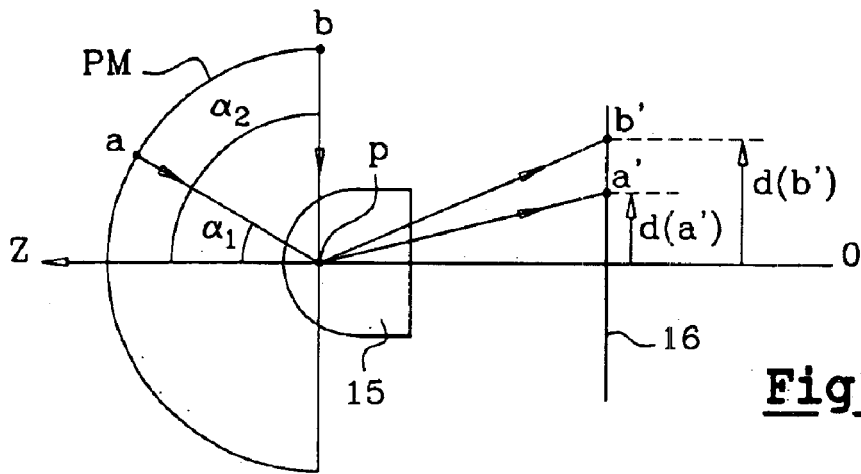
FIG. 4 is a schematic cross-section of a panoramic image capture system comprising a fish-eye objective lens according to the present invention.

Description of a panoramic image capture method according to the present invention I—Distortion of an Initial Image FIG. 4 schematically represents, by a cross-section, a panoramic image capture system comprising a fish-eye objective lens 15 according to the present invention having a constant field angle relative to its optical axis OZ, and a rectangular image sensor 16 arranged in the image plane of the objective lens 15.

Seen in the planigraphic plane in FIG. 4, the properties of the fish-eye objective lens 15 conform to those of a classical objective lens and are characterised by a determined angular distribution function Fd. As an example two object points a, b will be considered belonging to a panorama PM and respectively having field angles $\alpha 1$, $\alpha 2$. Conventionally, the field angle of an object point is the angle that an incident light ray passing through the object point considered and through the center of the panorama PM, marked by a point "p", has relative to the optical axis OZ. On the sensor 16, image points a', b' corresponding to the object points a, b are located at distances d(a'), d(b') from the center of the image that are linked to the angles $\alpha 1$, $\alpha 2$ by the following relations:

$$d(a')=Fd(\alpha 1) \quad (1)$$

$$d(b')=Fd(\alpha 2) \quad (2)$$

Fd being the distribution function of the image points relative to the field angle of the object points.

The objective lens 15 according to the present invention differs from a classical objective lens by the fact that the distribution function Fd varies according to the position of the object points in a plane perpendicular to the optical axis OZ. This will be better understood with reference to FIGS. 5A, 5B and 5C that show the properties of this objective lens.

Figures 5A, 5B:
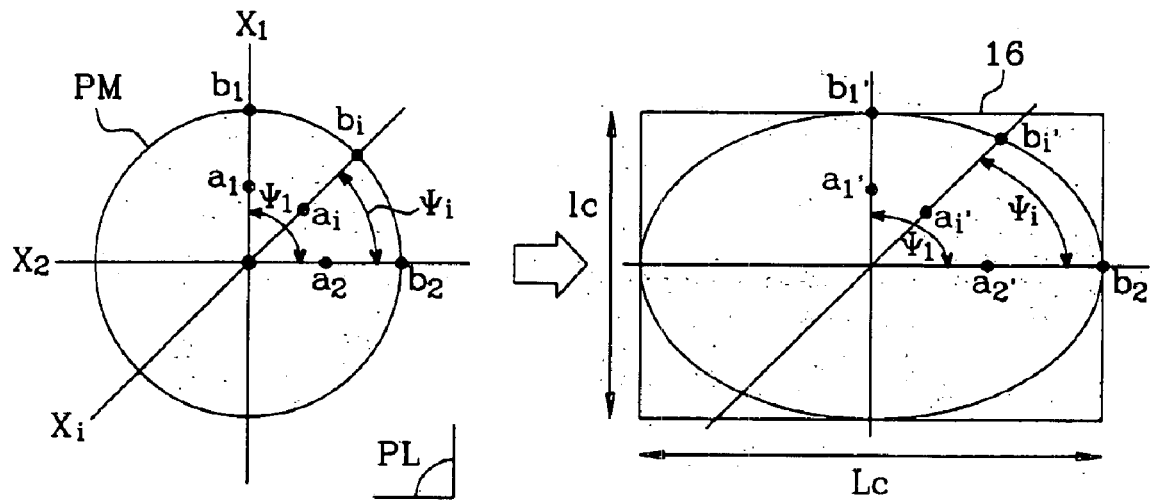
FIGS. 5A–5C represent optical properties of a fish-eye objective lens used to implement the image capture method according to the present invention.

FIG. 5A represents the panorama PM in the form of a circle, the optical axis OZ here being perpendicular to the plane of the Fig. The objective lens has two axes X1, X2 located in a plane PL perpendicular to the optical axis OZ (i.e. parallel or merged with the plane of the sheet), each of the two axes X1, X2 passing through the optical axis OZ. The angular deviation between the two axes X1, X2 is designated $\psi 1$ and is preferably equal to 90°. According to the present invention, the objective lens has a distribution function Fd[X1] along the axis X1 and a distribution function Fd[X2] along the axis X2. The functions Fd[X1] and Fd[X2] are different, the function Fd[X1] being the one that has a lower spreading rate of the image and the function Fd[X2] the one that has a higher spreading rate of the image.

For a better understanding, two pairs of object points a1, b1 and a2, b2 will be considered respectively arranged along the axis X1 and the axis X2, the points a1 and a2 having the same field angle $\alpha 1$ and the points b1 and b2 the same field angle $\alpha 2$ relative to the optical axis OZ (Cf. FIG. 4). FIG. 5B represents the projection of these points onto the rectangular image sensor 16. The objective lens is arranged relative to the image sensor 16 so that the axis with the lower spreading X1 coincides with the width of the sensor and the axis with the higher spreading X2 coincides with the length of the sensor. The axis X2 preferably corresponds to the horizontal axis of a shot taken and the axis X1 corresponds to the vertical axis. On the projected image, represented in FIG. 5B, image points a1', b1' along the axis X1 and image points a2', b2' along the axis X2 can be distinguished. The point a1' is at a distance d(a1')=F[X1]($\alpha 1$) from the center of the image, the point b1' is at a distance d(b1')=F[X1]($\alpha 2$) from the center of the image, the point a2' is at a distance d(a2')=F[X2]($\alpha 1$) from the center of the image and the point b2' is at a distance d(b2')=F[X2]($\alpha 2$) from the center of the image. With a classical fish-eye objective lens, the distance d(a2') would be equal to the distance d(a1') as the object points a1, a2 have the same field angle $\alpha 1$. Similarly, the distance d(b2') would be equal to the distance d(b1') as the object points b1, b2 have the same field angle α2. With the fish-eye objective lens according to the present invention, the distance d(b2') is greater than the distance d(b1') and the distance d(a2') is greater than the distance d(a1').

Preferably, the function Fd[X1] is chosen so that the image points present along the axis X1 occupy the whole effective width lc of the sensor. Similarly, the function Fd[X2] is chosen so that the image points present along the axis X2 occupy the whole effective length Lc of the sensor. Thus, if the field angles of the object points b1, b2 are equal to 90°, as represented in FIGS. 4 and 5A, and if the angular aperture of the objective lens is 180°, the distances d(b1'), d(b2') relative to the center of the image of the image points b1', b2' are respectively equal to lc/2 and Lc/2 (FIG. 5B).

In addition to the axes X1 and X2, the objective lens according to the present invention has an infinity of intermediate axes Xi along which the objective lens has distribution functions Fd[Xi] having a determined spreading rate higher than the minimum spreading rate. As an example, an axis Xi that has an angle ψi relative to the axis X1, with ψi lower than ψ1, and two object points ai, bi situated along the axis Xi and having field angles α1, α2 (FIG. 5A) will be considered. The corresponding image points ai', bi' on the sensor 16 (FIG. 5B) are located at distances d(ai')=F[Xi](α1) and d(bi')=F[Xi](α2) relative to the center of the image. The distances d(ai') and d(bi') are respectively greater than d(a1') and d(b1').

Therefore, the distribution function Fd of a fish-eye objective lens according to the present invention varies according to the axis along which the object points are located, in a plane perpendicular to the optical axis OZ, and has a minimum spreading rate along the axis XI and a maximum spreading rate along at least a second axis, i.e. the axis X2 in the example described above.

Below in relation with FIGS. 11–12, an embodiment of an objective lens according to the present invention will be described which delivers an ellipsoidal image, by using a toroidal lens having an axis of revolution parallel to the optical axis, equivalent to a cylindrical lens having an axis of revolution perpendicular to the optical axis. On FIG. 5B, the image point ai' is then located on an ellipse passing through the points a1' and a2' and the image point bi' is located on an ellipse passing through the points b1' and b2'.

Moreover, again according to the embodiment described below in relation with FIGS. 11 and 12, the function Fd is linear along each axis Xi of the objective lens, such that the distance d(ai') in relation to the center of the image of an image point ai' obeys the following relation:

$$d(ai') = Ki\alpha i \quad (3)$$

in which αi is the field angle of the corresponding object point ai, and Ki a distribution constant which varies according to the axis Xi along which the object point is located.

Figure 5C:
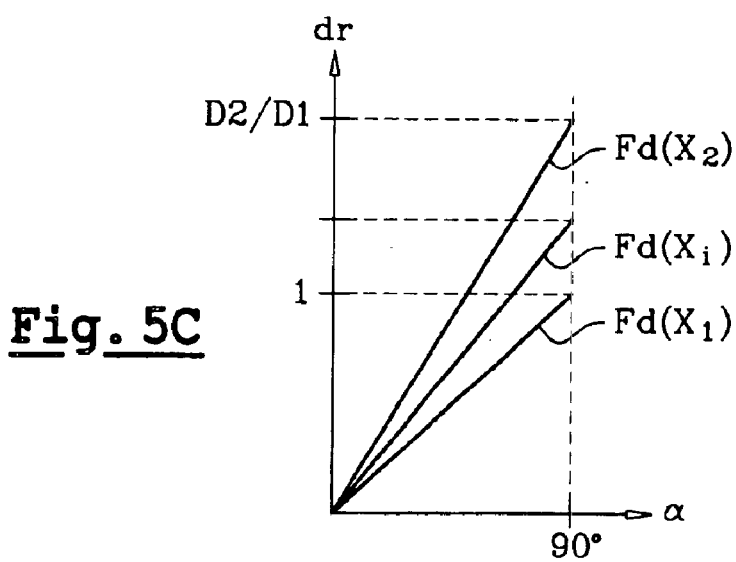

For a better understanding, examples of distribution functions Fd[Xi] of an objective lens according to the present invention are represented in curve form in FIG. 5C, on a graph comprising relative distances dr on the Y-axis and field angles α on the X-axis. The relative distance dr of an image point is the distance of the image point in relation to the center of the image divided by the greatest distance relative to the center of the image of an image point situated on the axis X1. In the case of an ellipsoidal image, this greatest distance along the axis X1 is the half-length D1/2 of the minor axis of the ellipsoid.

On FIG. 5C three curves can be distinguished that correspond to the three distribution functions Fd[X1], Fd[X2], Fd[Xi]. In this example, these distribution functions are linear and are thus in the form of straight lines, of respective gradients K1, K2 and Ki. The gradient K1 is equal to 1/90° for an objective lens having an angular aperture of 180°, the gradient K2 is greater than K1 and the gradient Ki is between K1 and K2. As indicated above, the gradient K2 is preferably equal to K1*Lc/lc so that the image covers the whole effective length Lc of the image sensor.

In the description below, the other aspects of the present invention will be described considering the case of a projection of an ellipsoidal image onto the image sensor. This ellipsoidal image will be designated an "image ellipsoid" while the classical image in the shape of a disk will be called an "image disk", in accordance with the usual terminology.

The advantage of the method according to the present invention is that the surface covered by the projected image is greater than the one covered by an image disk, without reducing the field of view, such that the number of pixels covered by the image is higher. The gain in definition obtained using the present invention, expressed in a ratio of pixels, is easy to calculate in the case of an ellipsoidal image. On the surface area of the image sensor, the image ellipsoid covers a number of pixels NP equal to:

$$NP = \pi(D1/2)*(D2/2)*Np \quad (4)$$

Np being the number of pixels of the sensor per unit of area, D2 being the major axis and D1 the minor axis of the ellipsoidal image (it shall be noted here that D1 is imposed by the effective width lc of the sensor and that D2 can, at the most, be equal to the effective length Lc of the sensor).

In comparison, the number of pixels NP covered by an image disk is:

$$NP' = \pi(D1^2/4)*Np \quad (5)$$

D1 being the diameter of the image, imposed by the width of the sensor.

By combining the relations (4) and (5), the percentage G % of pixels gained between an image ellipsoid and an image disk is equal to:

$$G\% = (D1/D2 - 1)*100$$

The number of pixels that image sensors of consumer digital cameras currently comprise is in the order of 2 million pixels, i.e. 1600×1200 pixels, the 4/3 ratio corresponding to the standard of the consumer digital photography market. An objective lens according to the present invention performing an ellipsoidal projection offers, in these conditions, a 33% gain in number of pixels covered, which represents a significant gain in definition along the axis X2 and in the parts of the image located in the vicinity of the axis X2.

This gain is even higher when the method according to the present invention is implemented with a conventional camera using a film having a length to width ratio of 3/2 (format 24*36 of commercial films). The photograph taken is then digitised with a scanner having a determined definition. After digitisation, the gain in number of pixels covered (at constant definition during the digitisation) is then of 50%.

It will thus be noted here that the method according to the present invention is applicable both to digital photography techniques using digital image sensors and to digital photography techniques comprising a step of taking a conventional photograph followed by a step of digitizing the photograph by means of a scanner. Therefore, in the present application, the term "digital image sensor" designates both a digital image sensor and a conventional photographic film combined with a digitisation device such as a scanner.

II—Correction of the Distortions of the Initial Image

A first aspect of the present invention was described above, according to which an expansion of an image projected onto an image sensor was provided in order to improve the definition of the image in expanded zones, by increasing the number of pixels of the image sensor covered by the expanded zones. Before describing an example of an embodiment of a fish-eye objective lens according to the present invention, a second aspect of the present invention will be described which involves correcting the distortions of the initial image so as to present the observer with an image free from optical distortion. As indicated above, the description of this aspect of the present invention will be given with reference to an image ellipsoid.

This second aspect of the present invention is implemented at the stage of the processing of the initial image by computer, to present an interactive panoramic image on a screen. The means for implementing the method of the present invention are shown in FIG. 6 and are classical per se as far as their general arrangement is concerned. A digital camera 20 can be distinguished equipped with a fish-eye objective lens 21, here an objective lens according to the present invention, connected to a microcomputer 22 comprising a screen 23. Digital images IMi taken by means of the camera 20 are transferred to the microcomputer to be processed and displayed on the screen 23, in a display window DW. A processing program according to the present invention, comprising an algorithm for transforming and displaying the images is first loaded into the microcomputer, by means of a CD-ROM 25 or by downloading via the Internet for example. The camera 20 can be a still digital camera or a digital video camera and the connection to the microcomputer can be permanent or otherwise. In the case of a video camera, the microcomputer receives a flow of images that it processes in real time to display them on the screen.

In this context, the present invention provides two ways of correcting the distortions of the initial image. According to a first embodiment, the image ellipsoid is corrected so as to obtain a classical image disk. The corrected image disk is equivalent to an image disk produced by a classical fish-eye objective lens and can then be processed by any classical display software program available in stores, provided for transferring the image points of an image disk into a three-dimensional space and for interactively displaying a sector of the three-dimensional image on a screen. According to a second embodiment, the image is corrected in real time at the time the image points constituting the image sector to be presented in the display window DW are determined, by using the angular distribution function Fd of the objective lens.

First Embodiment of the Correction Method

FIGS. 7A and 7B show the first embodiment of the method according to the present invention. Here it is assumed that there is an initial image Img1 comprising an image ellipsoid ID1 of minor axis D1 and of major axis D2 (FIG. 7A). The initial image Img1 is transformed into a corrected image Img2 comprising an image disk ID2 of radius D3 (FIG. 7B). The radius D3 of the image disk ID2 is preferably equal to the major axis D2 of the image ellipsoid ID1, such that the image disk ID2 has a resolution equal or substantially equal to the resolution offered by the most stretched out zone of the image ellipsoid ID1), where the greatest density of information is to be found. Here it is the central part of the image located in the vicinity of the major axis D2.

This method therefore involves stretching the image vertically in a proportion of (D2/D1)*100 percent. It can be implemented by means of the algorithm 1 described below as an example, in which:

Img1 is the initial image comprising the image ellipsoid ID1,

Img2 is the image generated by algorithm 1, comprising a classical image disk ID2, a is the half-length of the minor axis of the image ellipsoid ID1, expressed in number of pixels, i.e. $a=D1/2*Np1$, Np1 being the number of pixels per unit of length of the image sensor used, b is the half-length of the major axis of the image ellipsoid ID1, expressed in number of pixels, i.e. $b=D2/2*Np1$, b is also the radius of the image disk ID2, expressed in number of pixels, "O" designates the center of the initial image Img1 as well as the center of the image generated Img2, i and j are the coordinates of an image point Img2[i,j] in the image Img2, i designating the columns, j the lines, the coordinate point (0,0) being in the center of the image, r is the distance in relation to the center of the image of an image point in the image Img2, "u" and "v" are the coordinates of an image point Img1 [u,v] in the initial image Img1, "u" designating the columns, "v" the lines, the coordinate point (0,0) being in the center of the image,

[OU) is a reference axis of direction U having its origin in O,

[OP] is a straight line segment having a point of origin in O and an end point in P, P being an image point of coordinates (u,v), θ is an angle between the axis [OU) and a segment [OP], "√" is the square root function.

"arc cos" is the inverse function of the cosine function.

---

ALGORITHM 1

```
1/   For i = -b to +b
2/     For j = -b to +b
3/       r = √(i*i+j*j)
4/       If (r≤b) then
5/         If j<0 then
6/           θ = arc cos(i/r)
7/         If not
8/           θ = -arc cos(i/r)
9/         End if
10/        u = r*cos(θ)
11/        v = (a/b)*r*sin(θ)
12/        Img2[i,j] = Img1[u,v]
13/      End if
14/    End for
15/ End for
```

---

In practice, the algorithm 1 can be improved by subsequently performing a bilinear interpolation on the image Img2, in itself well known by those skilled in the art, so as to smooth out the final image.

FIG. 8 is a flow chart giving a general overview of the steps of a method for capturing and interactively presenting a panoramic image on a screen. This flow chart is described in Table 1 in the Appendix, that is an integral pair of the description. The steps S1 and S2, respectively the acquisition of the image and the transfer of the image into a computer, are classical in themselves and differ from previous practices by the fact that the captured image is ellipsoidal in shape. The step S3 of correcting the image ellipsoid ID1 is executed in accordance with the method of the present invention, by means of the algorithm described above for example. The step S4, called "digitisation", is also classical. This step involves transferring the image points of the image disk ID2 into a three-dimensional space of axes OXYZ in which the image points are for example referenced in spherical coordinates. The step S5 is also classical and involves presenting a sector of the image in the display window DW. The display window is moved upwards or downwards depending on the user's actions, or is enlarged at the user's request. When enlarged, the definition is better than in previous practices in the zones corresponding to the expanded parts of the initial image.

Second embodiment of the Correction Method

Figure 9:
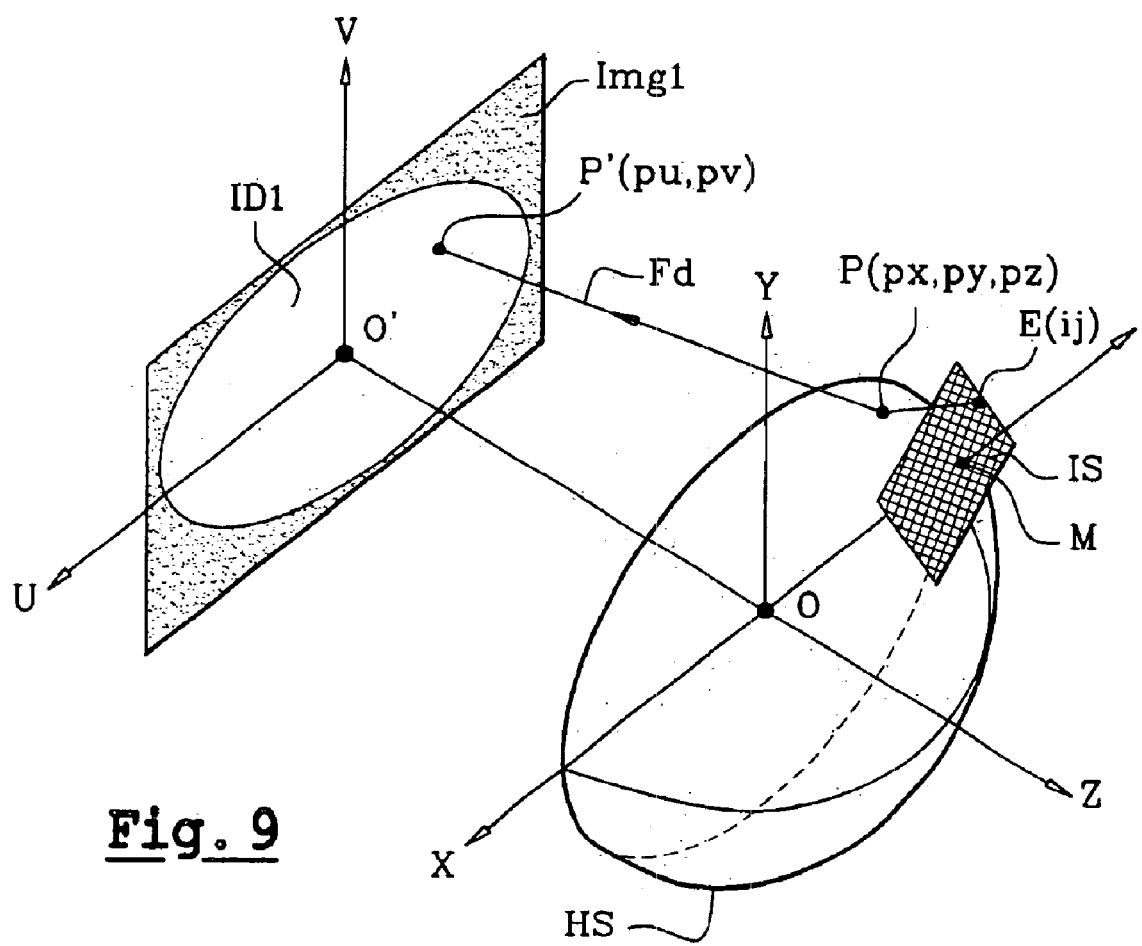
FIG. 9 shows a second method for correcting a panoramic image according to the present invention.

The second embodiment of the correction method according to the present invention is shown in FIG. 9. Very schematically, this method involves projecting the image points of an image sector IS to be presented in the display window DW (FIG. 6) onto the image ellipsoid ID1 of the initial image Img1. This method does not require calculating a corrected image disk.

The image points of the image sector IS to be displayed in the window DW are referenced E(i,j) in the coordinate system of the image sector IS, that is expressed in line coordinates i and in column coordinates j. The points E(i,j) are first projected onto a sphere portion HS of center O and of radius R in a coordinate system of origin O and of axes OX, OY, OZ, to obtain image points P(px,py,pz) belonging to the sphere portion.

Out of concern to remain simple, it will be considered that the fish-eye objective lens that is used here has an angular aperture of 180°. The sphere portion HS is in this case a hemisphere. The image sector IS moves tangentially to this hemisphere.

The image points P(px,py,pz) determined on the hemisphere HS are then projected onto the image ellipsoid ID1 by means of the distribution function Pd of the fish-eye objective lens, which first requires calculating the field angle $\alpha$ of the points P in relation to the center O of the hemisphere, the center O being the virtual equivalent of the center "p" of the panorama at the time the image is captured. The projection of the image points P(px,py,pz) onto the hemisphere HS allows image points P'(pu,pv) to be obtained on the image ellipsoid, in a coordinate system of center O' corresponding to the center of the image ellipsoid and of axes O'U and O'V. The axis OZ in the system of the hemisphere is perpendicular to the plane of the image ellipsoid ID1 and passes through the center O', such that the axes O'Z and OZ are merged.

As it will be clear to those skilled in the art, the correction of the distortions of the image is implicit here since the image points P'(pu,pv) corresponding to the image points E(i, j) of the image sector IS are "retrieved" from the image ellipsoid ID1, by means of the distribution function Fd.

The method according to the present invention is implemented by means of the algorithm 2 described below, in which:

i and j are the coordinates of a point E(i, j) of the image sector IS,

Imax and Jmax are the number of columns and the number of lines of the image sector IS, Ex, Ey and Ez are the Cartesian coordinates of a point E(i,j) of the image sector IS in the coordinate system OXYZ, px, py and pz are the Cartesian coordinates of a point P(px,py,pz) on the hemisphere HS, pu and pv are the Cartesian coordinates of an image point P'(pu,pv) of the image ellipsoid in the coordinate system O'UV, L1 is the size of the half minor axis of the image ellipsoid, expressed in number of pixels ($L1=D1/2*Np1$), L2 is the size of the half major axis of the image ellipsoid, in number of pixels (L1=D2/2*Np1), M is the center of the image sector IS, the "viewing direction" is the direction materialized by the point O and the center M of the image sector IS, the image sector forming the base of a pyramid of vision of the observer the top of which is the point O (observer's position), $\theta 0$ and $\phi 0$ are the longitude and latitude of the viewing direction, Screen_Pixel[ij] is the color (RGBA) of a point E (ij) of the image sector IS, Image_Pixel[pu,pv] is the color of a point P'(pu,pv) of the image ellipsoid ID1, R is the radius of the hemisphere HS used as reference for the tangential sliding of the image sector IS, R having an arbitrary value chosen so as to improve the accuracy of the calculations, such as 10,000 for example, $\alpha$ is the angle in relation to the center O of an image point P(px,py,pz) (represents the field angle at the time the shot is taken of the corresponding object point), aux1, aux2 are intermediate variables, "Zoom" is a variable defining the enlargement, having a default value equal to R, and "$\sqrt{}$" is the square root function.

---

ALGORITHM 2

1/ For i=−Imax/2 to i=Imax/2 do [by increments of 1]
2/     For j=−Jmax/2 to j=Jmax/2 do [by increments of 1]
[calculation of the Cartesian coordinates Ex, Ey, Ez of the point E of the image sector in the coordinate system (OXYZ)]
3/         Ey = j*cos($\phi$0) − Zoom*sin($\phi$0)
4/         Ez = Zoom*cos($\phi$0) + j*sin($\phi$0)
5/         aux1 = Ez
6/         Ez = Ez*cos($\theta$0) − i*sin($\theta$0)
7/         Ex = i*cos($\theta$0) + aux1*sin($\theta$0)
[calculation of the coordinates of a point P corresponding to the point E]
8/         aux2 = R/$\sqrt{(Ex*Ex + Ey*Ey + Ez*Ez)}$
9/         px = Ex*aux2
10/        py = Ey*aux2
11/        pz = Ez*aux2
[calculation of the coordinates of a point P'(pu,pv) corresponding to the point P(px,py,pz)]
12/        X = px/R
13/        Y = py/R
14/        r = $\sqrt{(X*X + Y*Y)}$
15/        $\alpha$ = arc sine(r) [angle in relation to the center]
16/        U = X/r
17/        V = Y/r
18/        pu = L1*U*Fd($\alpha$)
19/        pv = L2*V*Fd($\alpha$)
[allocation of the color of the point P'(pu,pv) to the point E(i,j) of the image sector]
20/        Screen_Pixel[ij] = Image_Pixel[pu,pv]
21/     end for
22/ end for

---

It will be noted that the function Fd used here in steps 18 and 19 is not a function Fd[Xi] that depends on the axis Xi considered but is the function Fd[X1] along the axis X1. Indeed, the choice has been made here to simplify the algorithm so as not to take into account the angle $\psi$, which is made possible by the ellipsoidal shape of the image ID1. The adaptation of the steps 18 and 19 to the ellipsoidal shape of the image is ensured by the parameters L1 and L2. If the function Fd[X1] is linear, each value of Fd(α) is calculable during the steps 18 and 19 by means of the following relation:

$$Fd(\alpha) = Fd[X1](\alpha) = K1 * \alpha$$

with K1=2π/α

A request for enlargement (zoom) by the user results in the algorithm modifying the "Zoom" parameter. When the "Zoom" parameter is equal to the radius R of the hemisphere, no zoom is performed. When the "Zoom" parameter is higher than R, the window DW moves away from the hemisphere HS (along the axis given by the viewing direction OM), which corresponds to a shrinking of the pyramid of vision and thus an enlargement of the image sector presented in the window DW. The enlargement of the image sector presented to the observer is therefore equal to the ratio of the "Zoom" and R parameters.

When the algorithm is executed with a "Zoom" parameter higher than R, a gain in definition is obtained in the zones in which the image has been expanded at the time the shot is taken as there are still, while the resolution limit is not reached, two image points on the image ellipsoid ID1 which correspond to two adjacent pixels of the image sector. In the non-expanded zones of the image, the search for the closest pixel by means of the relations L1*U*Fd(α) and L2*V*Fd (α) results, on the other hand, in the algorithm finding the same image point for several adjacent pixels of the image sector IS on the image ellipsoid ID1. However, these non-expanded image zones benefiting from a lesser definition on the image ellipsoid, equivalent to that obtained with a classical fish-eye objective lens, are considered secondary for the intended application, in accordance with the premise on which the present invention is based.

Generally speaking, it will be clear to those skilled in the art that other projection methods can be provided, it being essential to find the field angle α of the object points on the hemisphere HS, in relation to the center O, so as to use the distribution function Fd in the calculations.

It will be understood that the algorithm 2 is applicable when there are two complementary image ellipsoids, one corresponding to a front photograph and the other to a rear photograph of a panorama, the second photograph being taken by rotating the fish-eye objective lens according to the present invention by 180° around an axis passing through the center of the panorama. In this case, two complementary hemispheres and two image points called "Front_image_Pixel" and "Rear_Image_Pixel" are defined. The steps 18 and following of the algorithm are thus modified as follows:

| | |
|---|---|
| 18'/ | pu = L1*U*Fd(α) |
| 19'/ | pv = L2*V*Fd(α) |
| 20'/ | If pz >= 0 then |
| 21'/ | Screen_Pixel[i,j] = Front_Image_Pixel[pu,pv] |
| 22'/ | If not |
| 23'/ | Screen_Pixel[i,j] = Rear_Image_Pixel[L1-pu,pv] |
| 24'/ | End if |
| 25'/ | end for |
| 26'/ | end for |

FIG. 10 is a flow chart giving a general overview of the steps of a method for capturing and interactively presenting a panoramic image on a screen. This flow chart is described in Table 2 in the Appendix, that is an integral part of the description. The acquisition S1 and transfer S2 steps described above are again included. The step S2 is followed by an interactive display step S3' performed in accordance with the method that has just been described, implicitly incorporating a correction of the distortions of the image ellipsoid through the use of the distribution function Fd of the objective lens to find the points corresponding to the pixels of the image sector on the image ellipsoid.

III—Example of an Embodiment of a Fish-Eye Objective Lens According to the Present Invention The design of an ellipsoidal projection fish-eye objective lens is based here on the use of cylindrical lenses. This type of lens is already known per se and used in cinema to obtain lenses of cinemascope format. This type of lens is also used in compact disk players to position the laser beam on the surface of a compact disk with great precision.

As part of the present invention, cylindrical lenses (also called toroidal lenses when the radius of curvature is infinite) are used to increase the resolution lengthwise of the image sensor, in combination with lenses performing fish-eye type image capture. The intended technical effect can be obtained using one or more cylindrical lenses placed at one end of a group of lenses equivalent to a fish-eye objective lens, the image being stretched along the perpendicular of the axis of the cylinder.

One particular embodiment of an objective lens according to the present invention is described below as an example without limitation.

Figure 11:
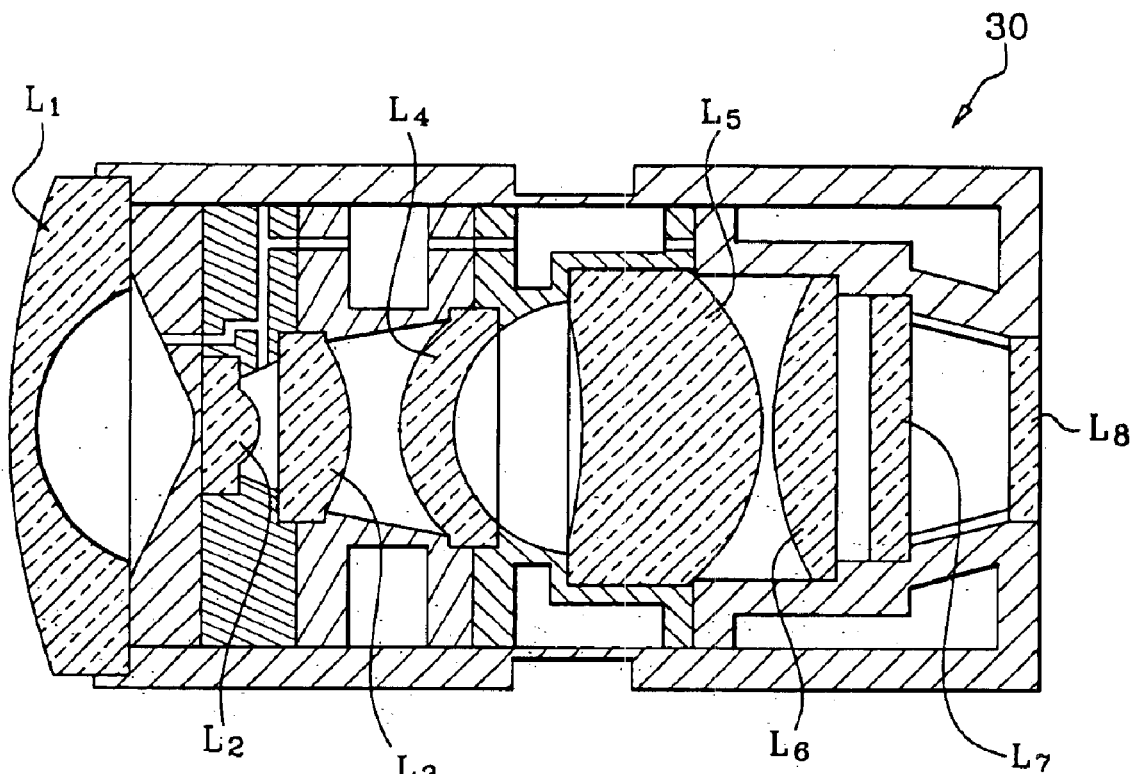
FIG. 11 shows by a cross-section an example of an embodiment of a fish-eye objective lens according to the present invention.
Figure 12:
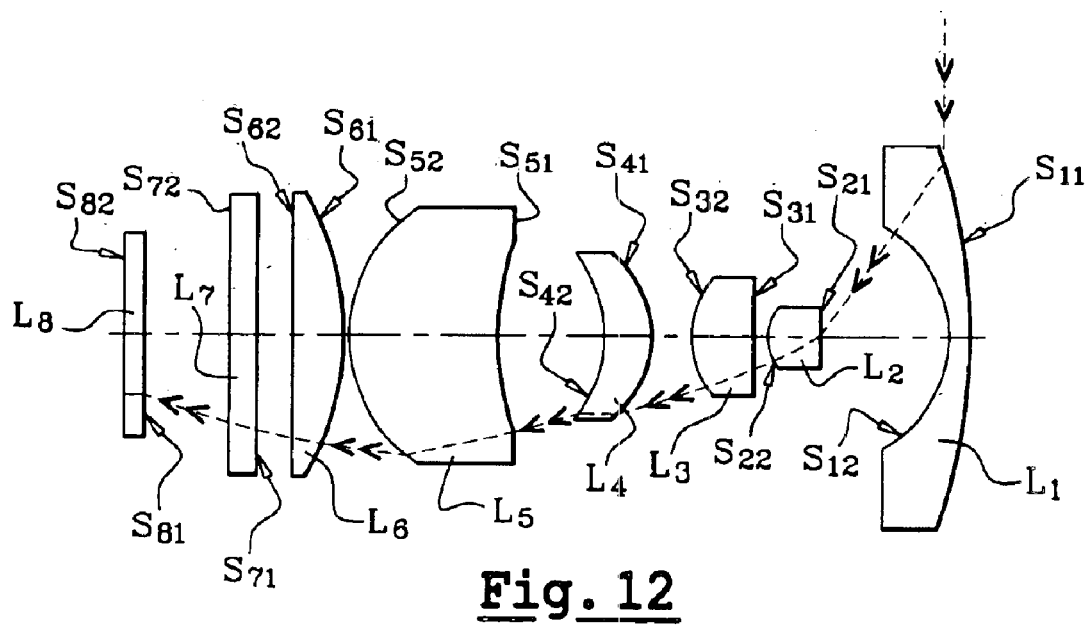
FIG. 12 is an exploded cross-section of a system of lenses present in the objective lens in FIG. 11.

FIG. 11 is a cross-section of a fish-eye objective lens 30 according to the present invention. The objective lens 30 is here of the panoramic adapter type ("pano-converter") and is designed to be mounted onto the front lens of a still camera. It also relates to consumer cameras of the non-SLR (non Reflex) type comprising a 35 mm fixed objective lens.

The objective lens 30 comprises, in the direction from the input of the light rays (left of FIG. 11) towards the output of the light rays, eight lenses L1 to L8. The lens L1 is an aspherical lens in acrylic of divergent meniscus type, the front of which is convex and the back concave. The lens L2 is a spherical lens in acrylic of convergent meniscus type, the front of which is concave and the back convex. The lens 13 is an aspherical lens in acrylic of biconvex type. The lens L4 is an aspherical and diffractive lens (asphero-diffractive) of convergent meniscus type the front of which is convex and the back concave, the back comprising a diffraction grating. The lens L5 is an aspherical lens in acrylic of the convergent meniscus type, the front of which is concave and the back convex. The lens L6 is a plano-convex spherical lens in BK7 (borosilicate or standard mineral glass used in optics), the front of which is convex.

According to the present invention, the lenses L7 and L8 are cylindrical lenses having an axis of revolution perpendicular to the optical axis. To those skilled in the art, these lenses are the equivalent of a torus portion of infinite radius having an axis of revolution parallel to the optical axis. The lens L7 is a planoconcave cylindrical lens in BK7 the back of which is concave (the concavity is not shown on FIG. 11 due to its low value). The lens L8 is a cylindrical lens of planoconvex type in BK7, having its front convex.

Schematically, the lens L1 allows a panoramic image to be captured according to a desired field angle, here a field angle of 185°. The back of the lens L2 corresponds to a pupil, and forms the main diaphragm of the optical system. The lens LA is a field lens which contributes to the pupillary imaging. The diffractive surface that this lens has, in addition to its dioptric function, causes a phase shift of the light wave complying with a polynomial law of the radius of aperture. The lenses L8 and L7 perform the ellipsoidal distortion sought. The other lenses have no special role, but they contribute to obtaining the final result and to the overall performances of the objective lens according to the present invention.

A detailed embodiment of the panoramic adapter lens 30 is described by the table 3 in the Appendix, that is an integral part of the description. The table 3 describes the properties of each surface with reference to FIG. 12, which is an exploded view of the lens system. On this Fig., the front and back of the lens L1 are referenced S11 and S12, the front and back of the lens L2 are referenced S21 and S22, the front and back of the lens L3 are referenced S31 and S32, etc., the front and back of the lens L8 being referenced S81 and S82.

The aspherical surfaces are determined by means of a surface equation of the type:

$$z(r)=[(C^*r^2)(1+\sqrt{(1-(1+k)^*C^{2*}r^2)}]+A_1r^2+A_2r^4+A_3r^6+A_4r^8+A_5r^{10}$$

in which:
- "k" is a conicity constant,
- "A1", "A2", "A3", "A4", "A5" are constants for adjusting the coefficient of conicity according to the position,
- "z" is the shape of the surface,
- "r" is the radius at the center, and
- "C" is the radius of curvature.

The thickness and the diameters are expressed in millimeters. Conicity is a dimensionless quantity, a conicity of "0" designating a circle of revolution, a conicity of "−1" designating a parabola of revolution, a conicity between "−1" and "+1" designating an ellipse of revolution, a conicity lower than −1 or greater than +1 designating a hyperbola of revolution, the coefficients Ai in the surface equation allowing the general shape to be adjusted.

The diffractive side of the lens L4 is determined by means of a formula of the type:

$$\Phi(r)=\beta 1(r/R0)^2+\beta 2(r/R0)^4$$

in which:
- "r" is the distance in relation to the center of the lens of a point considered, located on the surface of the lens,
- β1 and β2 are constants defining the phase shift of the wave surface,
- "R0" is a constant allowing r to be normalized, and
- "φ" is the phase shift introduced by the diffractive surface at the point considered.

It will be clear to those skilled in the art that the combination of lenses that has just been described is only one example of an embodiment allowing a shape close to the rectangular shape of the image sensor to be obtained. Objective lenses could also be provided using toric lenses or bi-toric lenses more complex in shape, such as a torus with aspherical surface for example. In one alternative embodiment, an objective lens according to the present invention can be produced by means of an indirect-type optical system, that is using mirrors. In particular, a mirror of cylindrical or toroidal surface can be used to distort and spread the image on the surface of the image sensor.

IV—Scope of the Present Invention—Alternative Embodiments

The description above was of a method for capturing a panoramic image by means of a fish-eye objective lens and a digital image sensor rectangular in shape, in which the objective lens is designed to distort the panoramic image so as to cover a greater number of pixels on the image sensor without reducing the field of view. A method for displaying on a screen a sector of a panoramic image obtained according to this method was also described, comprising a step of correcting the distorted panoramic image. This correction step can comprise the correction of the image before transferring it into a three-dimensional space, leading to obtaining a classical image disk. The correction can also be implicit and be performed at the time an image sector to be presented on the screen is projected onto the non-corrected initial image, by using the distribution function of the objective lens or a similar mathematical function.

It will be clear to those skilled in the art that various alternatives of the present invention may be made relating to both the optical properties of the fish-eye objective lens used or its arrangement relative to the image sensor, and in the steps of subsequently processing the panoramic image obtained. Various applications of the present invention are also possible. In addition to applications to photography and to video, the present invention is particularly applicable to medicine, in endoscopy for example, in which rectangular image sensors are generally used. The field angles of the lenses used in these applications are generally lower than 180° and rather in the order of 140°.

Figure 13:
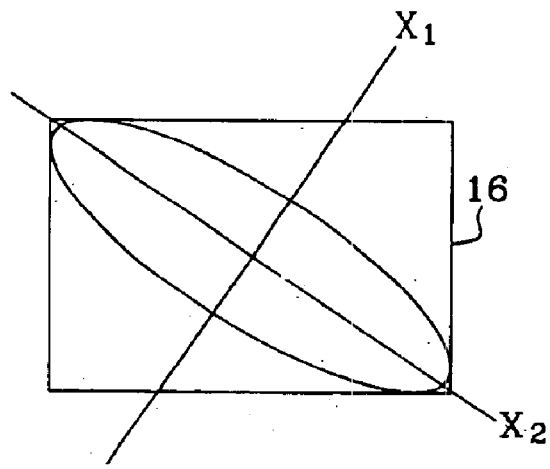
FIG. 13 shows one alternative of the panoramic image capture method according to the present invention.

Alternative Relating to the Relative Arrangement of the Image Sensor and the Axes X1 and X2 of the Objective Lens FIG. 13 represents an alternative embodiment of the method according to the present invention in which the objective lens and the image sensor are arranged relative to each other so that the axis X2 (axis of greater spreading) coincides with a diagonal of the image sensor 16. This embodiment allows a greater number of pixels of the image sensor to be covered along the axis X2. Here, the objective lens has, along the axis X1 (axis of lower spreading), a distribution function F[X1] that compresses the image relative to a classical fish-eye objective lens. This embodiment amounts to giving maximum priority to the definition of the image along the axis X2, which in practice can correspond to the horizontal axis of a shot.

Alternative Comprising Providing a Non-Linear Fish-Eye Objective Lens

Figure 14A:
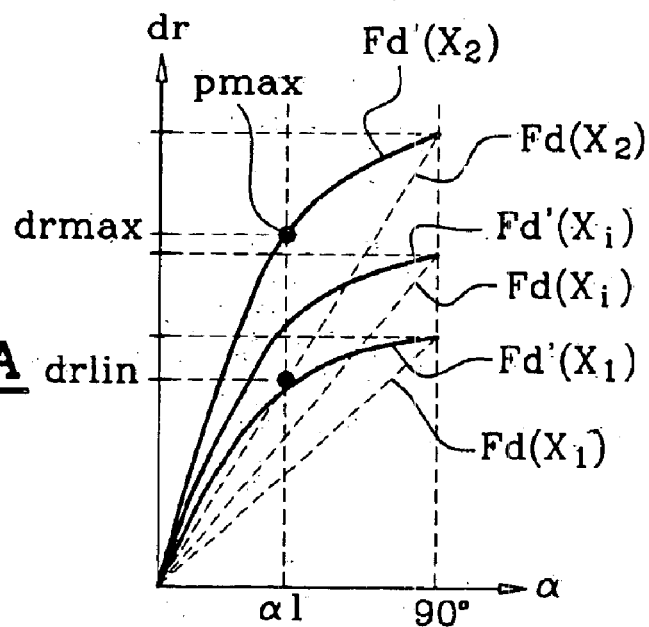
FIGS. 14A–14B show another alternative of the panoramic image capture method according to the present invention.
Figure 14B:
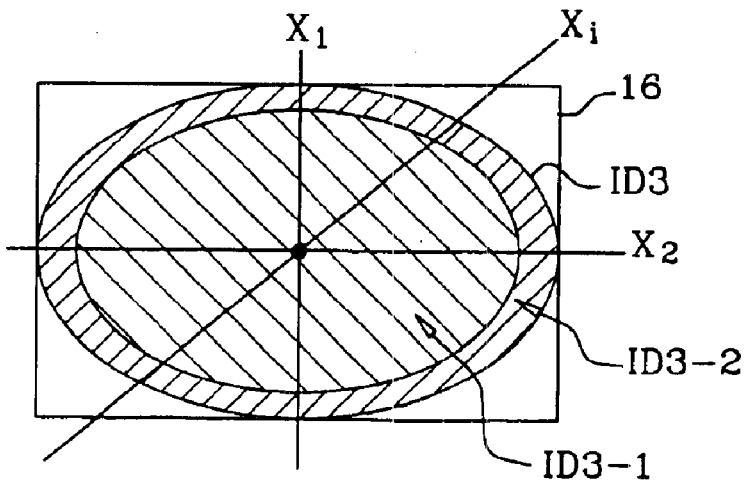

In one advantageous alternative of the method according to the present invention, an objective lens is provided that further has non-linear distribution functions Fd'[Xi] along its axes Xi. For a better understanding, FIGS. 14A–14B show the properties of an elliptic projection non-linear fish-eye objective lens. FIG. 14A is a graph comprising the relative distance dr of an image point (relative distance in relation to the center of the image) on the Y-axis and the field angle α of the corresponding object point on the X-axis. On this graph, the two most significant distribution functions of the objective lens are represented, that is the functions Fd'[X1] and Fd'[X2] along the axes X1 and X2, and a distribution function Fd'[Xi] along any axis Xi. The linear functions Fd[X1], Fd[X2], Fd[Xi] described above in relation with FIG. 5C are represented in dotted lines as points of comparison.

For field angles lower than an angle α1, the functions Fd'[X1], Fd'[X2], Fd'[Xi] each have a gradient higher than the gradient K1, K2, Ki of the corresponding linear function Fd[X1], Fd[X2], Fd[Xi]. That means that the image points corresponding to object points having a field angle between 0 and α1 are projected onto the image sensor with a spreading rate higher than the constants K1, K2, Ki and are therefore further apart from each other. For field angles higher than the angle α1, the functions Fd'[X1], Fd'[X2], Fd'[Xi] each have a gradient lower than the gradient K1, K2, Ki of the corresponding linear function Fd[X1], Fd[X2], Fd[Xi]. That means that the image points corresponding to object points having a field angle between α1 and A/2 (A being the angular aperture of the objective lens) are closer to each other.

An image ellipsoid ID3 obtained with this non-linear objective lens is represented in FIG. 14B. The image ellipsoid has a central ellipsoidal zone ID3-1 in which the image is expanded, and a peripheral zone ID3-2 in which the image is compressed. Thus a combination of two technical effects is obtained. The first technical effect is the increase in definition due to the spreading of the image along the axis X2. The second technical effect is a further increase in definition in the central zone ID3-1 of the image, to the detriment of the compressed zone ID3-2 that is considered less important The expanded zone benefits from a high definition as it covers a greater number of pixels on the image sensor, while the definition of the compressed zone is lower.

In practice, a maximum divergence of at least ±10% compared to a linear distribution function is necessary to obtain an image expansion that is substantially advantageous when a digital zoom is made. "Divergence" means the difference in percentage between the distance in relation to the center of an image point and the distance in relation to the center that would be obtained for the same image point if the distribution function were linear. The maximum divergence is the divergence measured at a point at which the non-linear function is the furthest away from the corresponding linear function. If the curve Fd'[X2] on FIG. 14A is considered as an example, it can be seen that there is an image point pmax at which the curve Fd'[X2] is the furthest away from the linear curve Fd[X2]. By designating by dcrmax the relative distance of the point pmax and by drlin the relative distance that this point would have in relation to the center of the image if the distribution function were linear, the maximum divergence is here equal to:

$$DIVmax\ \% = [[drmax-drlin]/[drlin]]*100$$

In practice, producing an objective lens having non-linear distribution functions Fd' [X1], Fd'[X2], Fd'[Xi] is within the understanding of those skilled in the art by adding a group of lenses forming an apodizer in an objective lens according to the present invention. Apodizers are optical systems well known by those skilled in the art, used for example as filters to cover the aperture of an optical instrument in order to remove the secondary rings of a diffraction pattern. Here, the idea of the present invention is to use an apodizer for a different purpose, that is to control the angular distribution of a panoramic lens and to obtain the non-linearity sought.

In practice, an apodizer can be produced simply by means of one or more aspherical lenses possibly combined with a diffractive surface. This optical group may, for example, comprise a planoconcave lens having a concave and aspherical front, a planoconvex lens having its plane side oriented towards the front, a meniscus having a concave and aspherical front and a diffractive, convex back.

Obtaining several non-linear functions Fd'[X1], Fd'[X2], Fd'[Xi], using a non-linear function Fd defined by the apodizer, is performed by a group of lenses of the type described above, comprising cylindrical lenses for example.

Another way of introducing an apodizer into an objective lens of the type described above is to provide an optical system comprising a plane mirror that reflects the light beam onto a distorting mirror of concave, aspherical shape, the beam reflected by the distorting mirror being sent onto the image sensor. In this embodiment, the irregularities of sphericity that the concave part of the mirror has determine the angular distribution function Fd sought for the intended application (distortion in the center, on the edges, etc.).

Generalization of the Correction Method and of the Algorithm 2

It must be noted here that modern computer-assisted lens design tools can be used to produce any type of objective lens according to the present invention, projecting a panorama in the form of an image of any shape covering more pixels than an image disk, having a linear or non-linear distribution function, using direct or indirect optical systems (mirrors).

In these conditions, and in anticipation of the different models of objective lenses according to the present invention that may be made, it is useful to provide a generalization of the correction method according to the present invention.

Figure 15A:
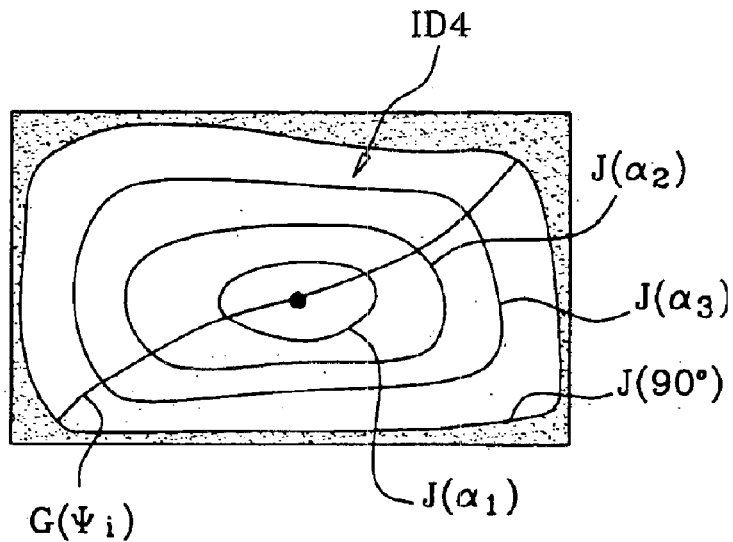
FIGS. 15A–15B show yet another alternative of the panoramic image capture method according to the present invention.

FIG. 15A shows the case in which a fish-eye objective lens according to the present invention projects onto an image sensor a distorted image ID4 of any shape which tends to be similar to the rectangular shape of the sensor. Several curves $J(\alpha 1)$, $J(\alpha 2)$, $J(\alpha 3)$, $J(\alpha=90°)$ can be distinguished each consisting of image points corresponding to object points having the same field angle $\alpha 1$, $\alpha 2$, $\alpha 3$, $\alpha=\pi°$. A curve $G(\psi i)$ can also be distinguished that represents the projection of a set of object points located along the same axis Xi of angle $\psi i$, the angle $\psi i$ here being measured in relation to one of the two axes of greater spreading X2, X2' that the objective lens comprises (these axes, not represented, substantially coincide with the two diagonals of the image sensor). It can be seen here that the curve $G(\psi i)$, or projection of the axis Xi onto the image sensor, is not rectilinear due to physical defects of the lenses naturally leading to this distortion. This distortion does not in any way hinder the implementation of the correction method according to the present invention and only requires the plurality of distribution functions $Fd[Xi](\alpha)$ of the objective lens according to the present invention being quantified at the time of the computer-assisted design of the objective lens. This quantification of the functions Fd[Xi] can take the form of a table giving for each object point defined by angles $\psi$, $\alpha$ the position of the corresponding image point on the distorted image ID4. To save on the memory space of the microcomputer in charge of displaying the image ID4 (in the form of an interactive image sector sliding tangentially to a sphere portion), the table can be sampled by removing a certain number of object points. The distribution function $Fd[\psi i](\alpha i)$ for each object point removed can then be calculated by interpolating the distribution functions of the adjacent object points.

Figure 15B:
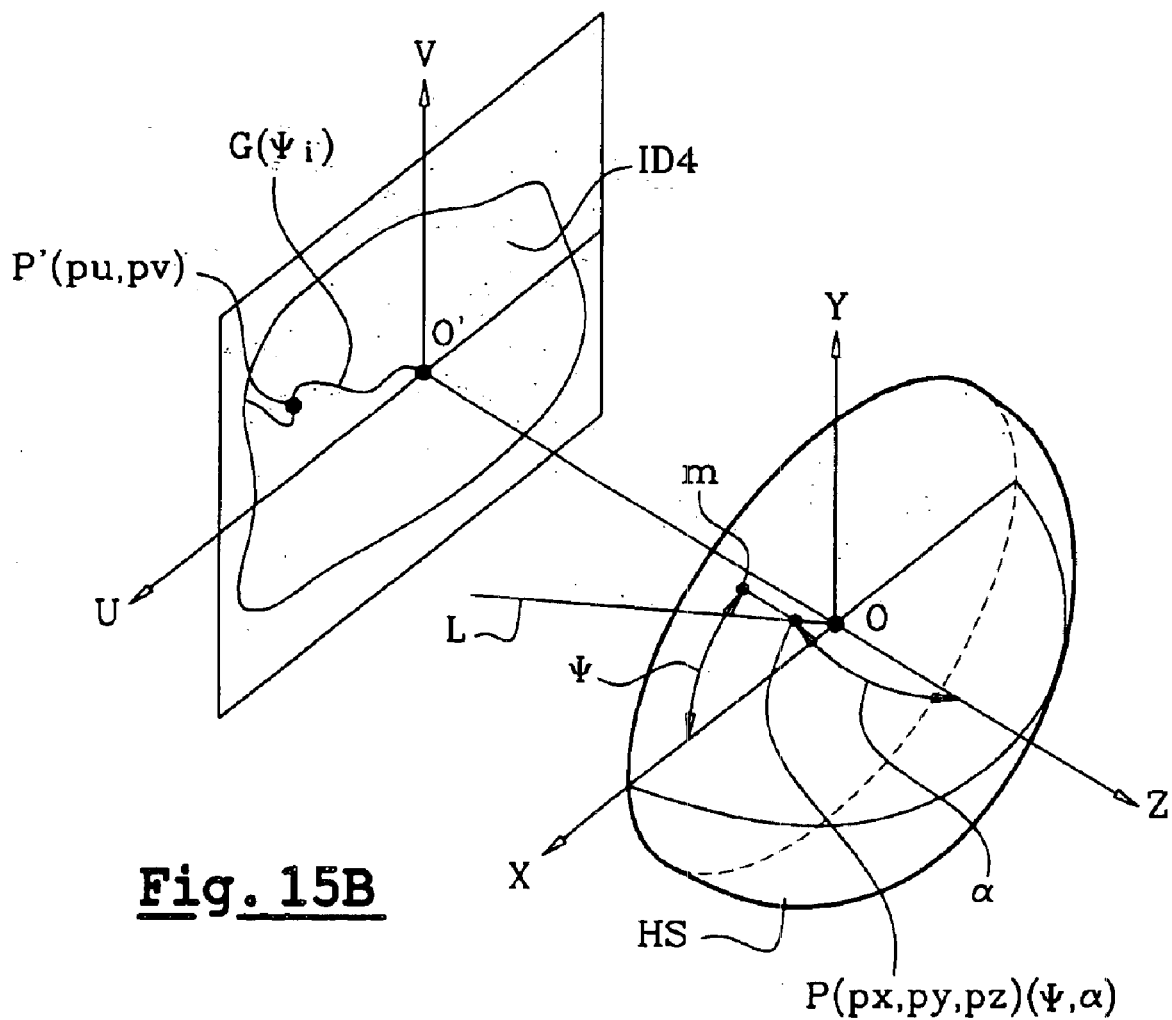

With reference to FIG. 15B, a point P(px,py,pz) will be considered as an example that is the projection onto a sphere portion HS of an image point E(i,j) of an image sector to be presented on a screen (not represented here). The point P(px,py,pz) has determined angles $\psi$ and $\alpha$. The angle $\psi$ is the angle that a point "m" that is the projection of the point P(px,py,pz) in the plane OXY has relative to the axis OX. The angle $\alpha$ is the angle in relation to the axis OZ that a segment of straight line L passing through the point P(px,py,pz) and through the center O of the sphere portion HS has. As explained above, the point P(px,py,pz) is the equivalent of an object point of the panorama photographed, the center O of the sphere portion HS is the equivalent of the center of the panorama photographed, the segment of straight line L is the equivalent of an incident light ray, the axis OZ represents the optical axis of the objective lens and the angle $\alpha$ represents the field angle of the object point P(px,py,pz).

It is then considered that the angles $\alpha$ and $\psi$ are between the following angles:

$$\psi i < \psi < \psi i+1$$

$$\alpha j < \alpha < \alpha j+1$$

and that the distribution functions of the objective lens have been quantified for the angles $\alpha i$, $\alpha i+1$, $\psi i$, $\psi i+1$, for example in a table T1 partially described below.

The coordinates (pu,pv) of a point P(pu,pv) that is the projection of the point P(px,py,pz) onto the distorted image ID4, are easy to calculate by interpolation, such as an interpolation on four values for example:

$$pu=[(pu)i,j+(pu)i+1,j+(pu)i,j+1+(pu)i+1,j+1]/4$$

$$pv=[(pv)i,j+(pv)i+1,j+(pv)i,j+1+(pv)i+1,j+1]/4$$

TABLE T1

|  | ψi | ψi+1 | ... |
|---|---|---|---|
| ... |  |  |  |
| αj | (pu)i,j//(pv)i,j | (pu)i+1,j//(pv)i+1,j |  |
| αj+1 | (pu)i,j+1//(pv)i,j+1 | (pu)i+1,j+1//(pv)i+1,j+1 |  |
| ... |  |  | ... |

Thus, the algorithm 2 described above can be generalised by replacing the lines 16 to 19 by the following steps:

[search for the angle ψ]
If px>0 then
ψ=arc cos(px/√(px²+py²))
if not if px<0
ψ=−arc cos(px/√(px²+py²))
if not if px=0 and py>0 then
ψ=π/2
if not if px=0 and py<0 then
ψ=−π/2
if not
ψ=0
End if
pu=L2*Fd[ψ](α)(1)
pv=L2*Fd[ψ](α)(2)

In these steps, Fd[ψ](α)(1) designates the coordinate "pu" of a point P'(pu,pv) corresponding to the projection onto the image ID4 of a point P(px,py,pz) belonging to the hemisphere HS, the point P being itself the projection of a point E(ij) belonging to the image sector to be displayed (not represented in FIG. 15B). Similarly, Fd[ψ](α)(2) designates the coordinate "pv" of the point P'(pu,pv).

Therefore, the algorithm 2 is generalized to any type of objective lens within the meaning of the present invention. In the case of a linear elliptic image, the function Fd[ψ]((α) can be expressed in the following mathematical form and does not require drawing up a quantification table:

$$Fd[\psi](\alpha)=[\cos(\psi)*2*(\pi/\alpha)*(L1/L2); \sin(\psi)*2*(\pi/\alpha)]$$

The example that has just been described shows that an objective lens according to the present invention can have several axes of greater spreading (X2, X2'). This example also shows that the axis or axes of greater spreading are not necessarily perpendicular to the axis X1 of lower spreading.

Appendix (Forming an Integral Part of the Description)

TABLE 1

S1 - Acquisition

- Capturing a panoramic image by means of a still digital camera or a digital video camera equipped with a fish-eye objective lens according to the present invention
=> Obtaining an image ellipsoid (D1, D2)
S2 - Transfer of the image file into a computer

- Transfer of the image file of the image ellipsoid into a

TABLE 1-continued microcomputer,
- Storage in the auxiliary storage (optional)
S3 - Correction of the image ellipsoid

- Transfer of the image points of the image ellipsoid into a virtual image disk of radius D2 comprising more image points than an image disk of radius D1,
=> Obtaining a classical image disk
S4 - Digitization

- Transfer of the image points of the image disk into a system of axes OXYZ in spherical coordinates
=> Obtaining a hemispherical panoramic image
S5 - Interactive display

- Determination of the image points of an image sector to be displayed
- Display of the image sector on a display window
- Detection of the user's actions on a screen pointer or any other control means,
- Detection of the user's actions on keys for image enlargement,
- Modification of the sector displayed (sliding the image sector displayed on the surface of the hemisphere and/or shrinking/expanding the image sector displayed)

TABLE 2

S1 - Acquisition

- Capturing a panoramic image by means of a still digital camera or a digital video camera equipped with a fish-eye objective lens according to the present invention
=> Obtaining an image ellipsoid
S2 - Transfer of the image file into a computer

- Transfer of the image file of the image ellipsoid into a microcomputer,
- Storage in the auxiliary storage (optional)
S3 - Interactive display with implicit correction of the distortions of the initial image A - Determination of the color of the points E(i,j) of an image sector using the points P'(pu,pv) of the image ellipsoid:
1 - Determination of the coordinates Ex, Ey, Ez in the coordinate system OXYZ of each point E(i,j) of the image sector,
2 - Determination of the coordinates px, py, pz of points P(px,py,pz) corresponding to the points E(i,j) projected onto a hemisphere,
3 - by means of the distribution function Fd of the objective lens, determination of the coordinates, in the coordinate system O'UV of the image ellipsoid, of the points P'(pu, pv) corresponding to the projection of the points P(px,py,pz) on the image ellipsoid,
B - Presentation of the image sector in a display window
C - Detection of the user's actions on a screen pointer or any other control means
D - Detection of the user's actions on enlargement keys
E - Modification of the image sector displayed (moving and/or shrinking/expanding the image sector)

TABLE 3

| Surfaces | Type | Comment | Radius of curvature | Thickness | Type of glass | Diameter | Conicity |
|---|---|---|---|---|---|---|---|
| S11 | ASPHERICAL | | −39.55 | 35 | | 39.5 | −4.07 |
| S12 | SPHERICAL | | −12.74 | 1.75 | ACRYLIC | 23 | 0 |
| S21 | SPHERICAL | | 14.17 | 12.93 | | 0.65 | 0 |
| S22 | SPHERICAL | | 4.61 | 4.87 | ACRYLIC | 6.5 | 0 |
| S31 | ASPHERICAL | | −77.92 | 1.19 | | 10 | 6.12 |
| S32 | SPHERICAL | | 11.57 | 6.41 | ACRYLIC | 13 | 0 |
| S41 | DIFFRACTIVE | | −9.82 | 3.75 | | 17.1 | −0.555 |
| S42 | SPHERICAL | | −12.71 | 4.58 | ACRYLIC | 16.5 | 0 |
| S51 | SPHERICAL | | −19.34 | 10.46 | | 20 | 0 |
| S52 | ASPHERICAL | | −34.68 | 14.69 | ACRYLIC | 25.5 | 0.0858 |
| S61 | SPHERICAL | | −26.35 | 0.45 | | 25.4 | 0 |
| S62 | SPHERICAL | | Infinite | 5.2 | BK7 | 25.4 | 0 |
| S71 | TOROIDAL | ANAMORPHOSE | Infinite | 3 | | 20 | 0 |
| S72 | SPHERICAL | | Infinite | 3.1 | BK7 | 20 | 0 |
| S81 | SPHERICAL | | Infinite | 8 | | 16 | 0 |
| S82 | TOROIDAL | ANAMORPHOSE | Infinite | 2 | BK7 | 16 | 0 |

We claim:

1. Method for capturing a digital panoramic image, comprising a step of projecting a panorama (PM) onto an image sensor (16) by means of a fish-eye objective lens having a constant field angle relative to its optical axis, the image sensor being rectangular in shape,
characterised in that the fish-eye objective lens (15, 30) is provided to project onto the image sensor (16), without reducing the field of view, a distorted panoramic image (ID1, ID3) which is not in the shape of a disk and which covers a number of pixels on the image sensor higher than the number of pixels that would be covered by a conventional image disk (4).

2. Method according to claim 1, wherein the fish-eye objective lens has an image point distribution function (Fd[xi], Fd'[Xi]) that varies according to axes (Xi) perpendicular to the optical axis (OZ) of the objective lens, and which has a minimum spreading rate of the image along a first axis (X1) perpendicular to the optical axis, and a maximum spreading rate of the image along at least a second axis (X2) perpendicular to the optical axis, such that the image projected onto the image sensor is expanded along the second axis (X2).

3. Method according to claim 2, wherein the first (X1) and the second (X2) axes of the objective lens are perpendicular and the image (ID1) projected by the objective lens onto the image sensor is ellipsoidal in shape.

4. Method according to claim 3, wherein the image sensor (16) is arranged relative to the first and second axes of the objective lens so that the major axis (D2) of the ellipsoidal image (ID1) coincides with an effective length (Ld) of the image sensor.

5. Method according to claim 3, wherein the image sensor (16) is arranged relative to the first and second axes of the objective lens so that the major axis (X2) of the ellipsoidal image coincides with a diagonal of the image sensor.

6. Method according to one of claims 2 to 5, wherein the objective lens has a distribution function (Fd'[Xi]) that is not linear and that has a maximum divergence of at least ±10% compared to a linear distribution function (Fd[Xi]), such that the projected image (ID3) has at least one substantially expanded zone (ID3-1) and at least one substantially compressed zone (ID3-2).

7. Method according to one of claims 1 to 6, wherein the fish-eye objective lens comprises a combination of a group of lenses (L1–L6) provided to capture a panoramic image according to a determined field angle, and, of at least one cylindrical lens (L7, L8) having an axis of revolution perpendicular to the optical axis of the objective lens.

8. Method for displaying on a screen (23) an initial panoramic image (ID1) captured in accordance with the method according to one of claims 1 to 7, characterised in that it comprises a step of correcting (S3, S3') the distortions of the initial image.

9. Method according to claim 8, wherein the correction step (S3) comprises transforming the initial image into a corrected digital image (ID2) in the shape of a disk, the diameter of the corrected image being chosen so that the corrected image comprises a number of image points higher than the number of pixels of the image sensor covered by the initial image.

10. Method according to claim 9, wherein the initial image (ID1) is ellipsoidal in shape and the corrected image (ID2) has a diameter (D3) the size in number of pixels of which is at least equal to the size in number of pixels of the major axis (D2) of the initial ellipsoidal image (ID1).

11. Method according to claim 8, comprising a step of projecting onto the initial image (ID1), image points (E(i,j)) of an image sector (IS) to be presented on the screen (23), allowing the colours of the image points of the image sector to be presented on the screen to be determined, the step of projecting the image points (E(i,j)) of the image sector (IS) onto the initial image (Ip1) being performed by means of a distribution function (Fd) representative of the optical properties of the fish-eye objective lens, such that the step of correcting (S3') the distortions of the initial image is implicit in the projection step.

12. Method according to claim 11, wherein the projection step comprises a first, step of projecting the image points (E(i,j)) of the image sector (IS) onto a sphere portion (HS), and a second step of projecting, onto the initial image (ID1), the image points (P(px,py,pz)) projected onto the sphere portion.

13. Computer program product recorded on a medium (25) and loadable into the memory of a digital computer (22, characterised in that it contains program codes executable by the computer, arranged to execute the steps of the display method according to one of claims 8 to 12.

14. Fish-eye objective lens having a constant field angle relative to its optical axis and comprising optical means (L1–L8) for projecting the image of a panorama (PM) onto an image sensor (16), characterised in that it comprises optical means (L6–L7) for projecting, without reducing the field of view, a distorted image (ID1, ID3) that is not in the shape of a disk and which covers a number of pixels on an image sensor higher than the number of pixels that would be covered by a conventional image disk (4).

15. Objective lens according to claim 14, having an image point distribution function (Fd[Xi], Fd'[Xi]) that varies according to axes (Xi) perpendicular to the optical axis (OZ) of the objective lens, and which has a minimum spreading rate of the image along a first axis (X1) perpendicular to the optical axis, and a maximum spreading rate of the image along at least a second axis (X2) perpendicular to the optical, axis, such that an image delivered by the objective lens is expanded along the second axis (X2).

16. Objective lens according to claim 15, having a distribution function (Fd'[Xi]) that is not linear and that has a maximum divergence of at least riot compared to a linear distribution function (Fd[Xi]), such that an image (ID3) delivered by the objective lens has at least one substantially expanded zone (ID3-1) and at least one substantially compressed zone (ID3-2).

17. Objective lens according to one of claims 14 to 16, comprising a combination of a group of lenses (L1–L6) provided to capture a panoramic image: according to a determined field angle, and of at least one cylindrical lens (L7, L8) having an axis of revolution perpendicular to the optical axis of the objective lens.

18. Objective lens according to one of claims 14 to 17, comprising optical means forming an apodizer.

19. Objective lens according to claim 18, wherein the optical means forming an apodizer comprise at least one aspherical lens.

20. Objective lens according to one of claims 14 to 19, comprising at least one distorting mirror.

21. Objective lens according to one of claims 14 to 20, characterised in that it is of the panoramic adapter type and is provided to be placed in front of a still camera non-panoramic objective lens.

* * * * *

UNITED STATES PATENT AND TRADEMARK OFFICE
CERTIFICATE OF CORRECTION

PATENT NO. : 6,865,028 B2
DATED : March 8, 2005
INVENTOR(S) : Christophe Moustier et al.

It is certified that error appears in the above-identified patent and that said Letters Patent is hereby corrected as shown below:

Column 7,
Line 50, the formula should read: -- $d(ai') = Ki\ \alpha I$ --;

Column 10,
Line 5, a new paragraph should start after "ID2";
Line 25, there should be no new paragraph after "Img1";
Line 62, "pair" should read -- part --;

Column 11,
Line 35, "Pd" should read -- Fd --;
Line 58, the second instance of "Imax" should read -- Jmax --;

Column 14,
Line 59, "LA" should read -- L4 --;

Column 17,
Line 26, "dcrmax" should read -- drmax --;

Column 18,
Line 15, "$\alpha 1, \alpha 2, \alpha 3, \alpha=\eta°$" should read -- $\alpha 1, \alpha 2, \alpha 3, \alpha=90°$ --;

Column 21,
Line 22, please delete the claims in their entirety and replace with the following:

1. A method for capturing a digital panoramic image comprising:

projecting a panorama onto an image sensor by means of a fish-eye objective lens having a constant field angle relative to its optical axis, the image sensor being rectangular in shape, the fish-eye objective lens being provided to project onto the image sensor, without reducing the field of view, a distorted panoramic image which is not in the shape of a disk and which covers a number of pixels on the image sensor higher than the number of pixels that would be covered by a conventional image disk.

2. The method according to claim 1, wherein the fish-eye objective lens has an image point distribution function that varies according to axes perpendicular to the optical axis of the objective lens, and which has a minimum spreading rate of the image along a first axis perpendicular to the optical axis and a maximum spreading rate of the image along at least a second axis perpendicular to the optical axis, such that the image projected onto the image sensor is expanded along the second axis.

UNITED STATES PATENT AND TRADEMARK OFFICE
CERTIFICATE OF CORRECTION

PATENT NO.      : 6,865,028 B2
DATED           : March 8, 2005
INVENTOR(S)     : Christophe Moustier et al.

It is certified that error appears in the above-identified patent and that said Letters Patent is hereby corrected as shown below:

Column 21 (cont'd),

3. The method according to claim 2, wherein the first and the second axes of the objective lens are perpendicular and the image projected by the objective lens onto the image sensor is ellipsoidal in shape.

4. The method according to claim 3, wherein the image sensor is arranged relative to the first and second axes of the objective lens so that the major axis of the ellipsoidal image coincides with an effective length of the image sensor.

5. The method according to claim 3, wherein the image sensor is arranged relative to the first and second axes of the objective lens so that the major axis of the ellipsoidal image coincides with a diagonal of the image sensor.

6. The method according to claim 2, wherein the objective lens has a distribution function that is not linear and that has a maximum divergence of at least ±10% compared to a linear distribution function, such that the projected image has at least one substantially expanded zone and at least one substantially compressed zone.

7. The method according to claim 1, wherein the fish-eye objective lens comprises a combination of a group of lenses provided to capture a panoramic image according to a determined field angle and at least one cylindrical lens having an axis of revolution perpendicular to the optical axis of the objective lens.

8. A method for displaying on a screen an initial panoramic image captured in accordance with the method according to claim 1, the method comprising:
        correcting the distortions of the initial image.

9. The Method according to claim 8, wherein the correction step comprises transforming the initial image into a corrected digital image in the shape of a disk, the diameter of the corrected image being chosen so that the corrected image comprises a number of image points higher than the number of pixels of the image sensor covered by the initial image.

10. The method according to claim 9, wherein the initial image is ellipsoidal in shape and the corrected image has a diameter the size in number of pixels of which is at least equal to the size in number of pixels of the major axis of the initial ellipsoidal image.

11. The method according to claim 8, further comprising:
        projecting, onto the initial image, image points of an image sector to be presented on the screen,

UNITED STATES PATENT AND TRADEMARK OFFICE
CERTIFICATE OF CORRECTION

PATENT NO. : 6,865,028 B2
DATED : March 8, 2005
INVENTOR(S) : Christophe Moustier et al.

It is certified that error appears in the above-identified patent and that said Letters Patent is hereby corrected as shown below:

Column 21 (cont'd), allowing the colors of the image points of the image sector to be presented on the screen to be determined, wherein the step of projecting the image points of the image sector onto the initial image is performed by means of a distribution function representative of the optical properties of the fish-eye objective lens, such that the step of correcting the distortions of the initial image is implicit in the projection step.

12. The method according to claim 11, wherein the projection step comprises a first step of projecting the image points of the image sector onto a sphere portion and a second step of projecting, onto the initial image, the image points projected onto the sphere portion.

13. A computer program product recorded on a medium and loadable into the memory of a digital computer, the computer program containing code executable by the computer that is arranged to execute the steps of the display method according to claim 8.

14. A fish-eye objective lens having a constant field angle relative to its optical axis and comprising optical means for projecting the image of a panorama onto an image sensor, the fish-eye objective lens comprises optical means for projecting, without reducing the field of view, a distorted image that is not in the shape of a disk and which covers a number of pixels on an image sensor higher than the number of pixels that would be covered by a conventional image disk.

15. The fish-eye objective lens according to claim 14, having an image point distribution function that varies according to axes perpendicular to the optical axis of the objective lens, and which has a minimum spreading rate of the image along a first axis perpendicular to the optical axis and a maximum spreading rate of the image along at least a second axis perpendicular to the optical axis, such that an image delivered by the objective lens is expanded along the second axis.

16. The fish-eye objective lens according to claim 15, having a distribution function that is not linear and that has a maximum divergence of at least ±10% compared to a linear distribution function, such that an image delivered by the objective lens has at least one substantially expanded zone and at least one substantially compressed zone.

UNITED STATES PATENT AND TRADEMARK OFFICE
CERTIFICATE OF CORRECTION

PATENT NO. : 6,865,028 B2
DATED : March 8, 2005
INVENTOR(S) : Christophe Moustier et al.

It is certified that error appears in the above-identified patent and that said Letters Patent is hereby corrected as shown below:

<u>Column 21 (cont'd),</u>

17. The fish-eye objective lens according to claim 14, comprising a combination of a group of lenses provided to capture a panoramic image according to a determined field angle and at least one cylindrical lens having an axis of revolution perpendicular to the optical axis of the objective lens.

18. The fish-eye objective lens according to claim 14, comprising optical means forming an apodizer.

19. The fish-eye objective lens according to claim 18, wherein the optical means forming an apodizer comprise at least one aspherical lens.

20. The fish-eye objective lens according to claim 14, comprising at least one distorting mirror.

21. The fish-eye objective lens according to claim 14, wherein the lens is a panoramic adapter lens and is provided to be placed in front of a still camera non-panoramic objective lens.

Signed and Sealed this

Twenty-third Day of August, 2005

JON W. DUDAS
*Director of the United States Patent and Trademark Office*